Figure 1:
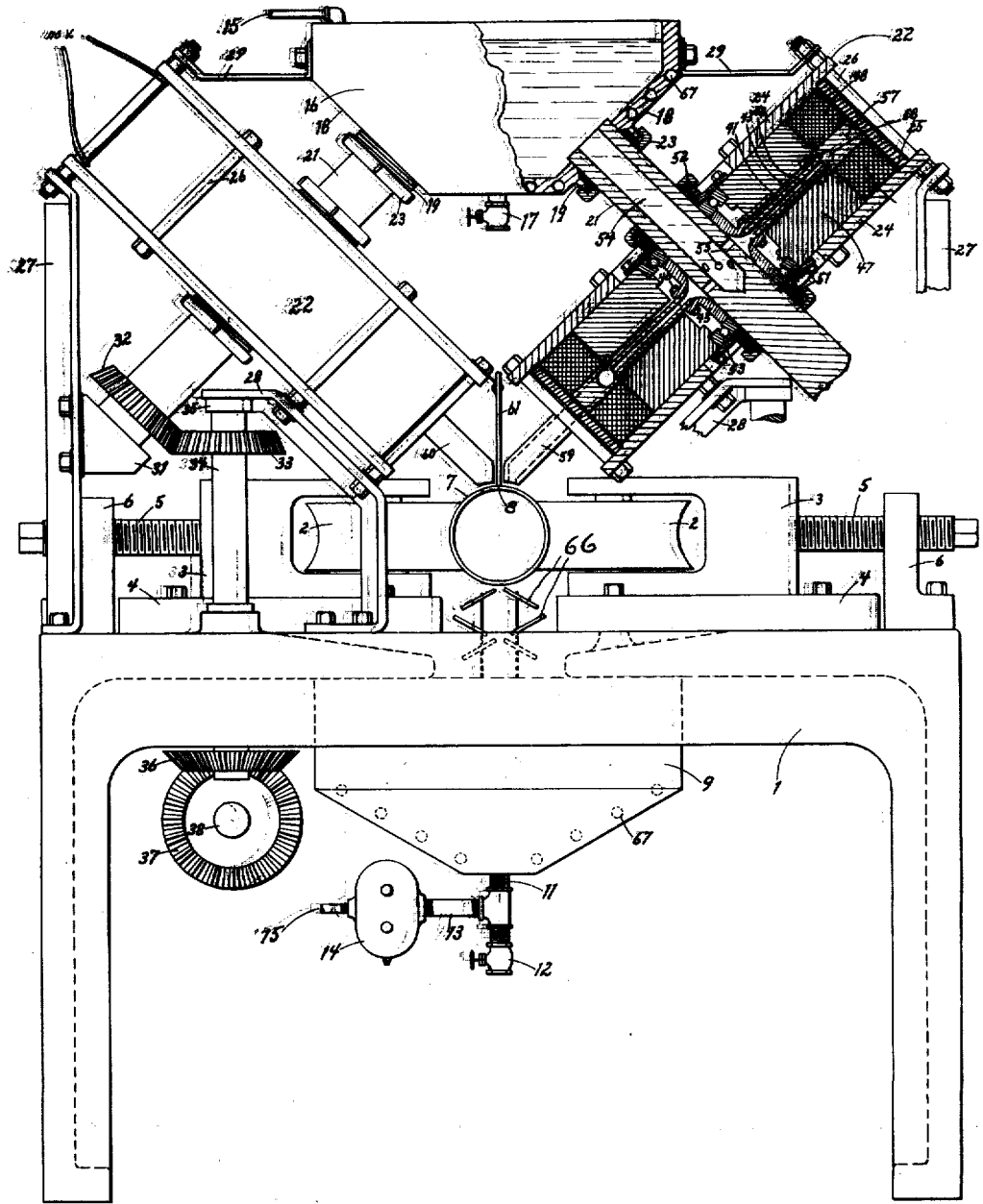

April 25, 1933.  E. CHAPMAN  1,905,147
HOMOPOLAR ELECTRIC GENERATOR, DISTRIBUTOR, AND METHOD OF APPLICATION
Filed June 27, 1929  3 Sheets-Sheet 1

INVENTOR.
Everett Chapman,
BY
Fay, Oberlin & Fay,
ATTORNEYS.

April 25, 1933. E. CHAPMAN 1,905,147
HOMOPOLAR ELECTRIC GENERATOR, DISTRIBUTOR, AND METHOD OF APPLICATION
Filed June 27, 1929 3 Sheets-Sheet 3
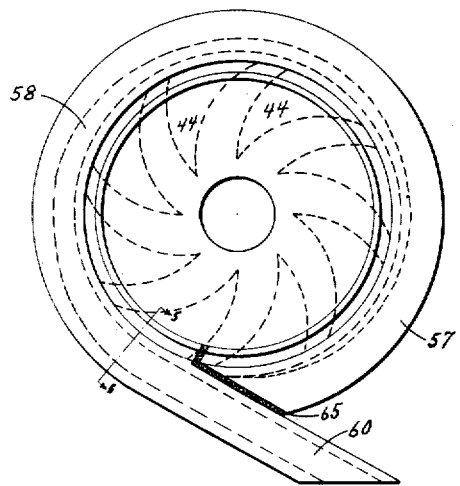
Fig. 3
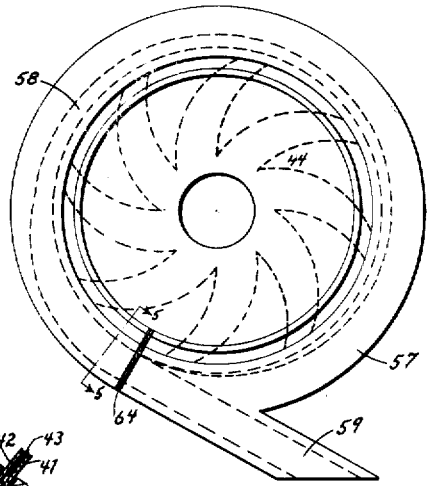
Fig. 4
Fig. 5
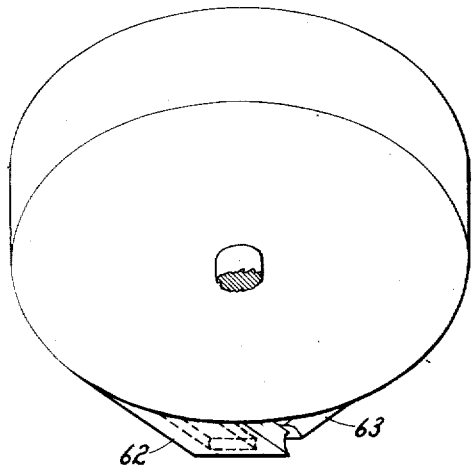
Fig. 6
INVENTOR.
Everett Chapman,
BY
Fay, Oberlin & Fay,
ATTORNEYS.

Patented Apr. 25, 1933

1,905,147

UNITED STATES PATENT OFFICE

EVERETT CHAPMAN, OF CLEVELAND HEIGHTS, OHIO

HOMOPOLAR ELECTRIC GENERATOR, DISTRIBUTOR, AND METHOD OF APPLICATION

Application filed June 27, 1929. Serial No. 374,161.

This invention, as indicated, relates to a homopolar electric generator, distributor and method of application. More particularly it comprises a method of generating and applying direct current to various uses and especially to resistance welding. The invention also embodies certain apparatus which combines the function of generating suitable current for carrying on the welding process and at the same time distributing the current conducting medium through a predetermined path, over a portion of which the welding current flows.

The method is particularly adapted for welding, although it is not intended to limit the method or apparatus to such use where the same is found adaptable for other purposes.

Heretofore it has been practically impossible to carry on direct current tube welding operations, because generating means embodying commutators are impractical in the required range of current quantities.

The present method and apparatus is believed to obviate the principal difficulties experienced with the use of direct current for welding operations, and the same is adapted not only for high speed tube welding on tubes of thin gauge but also for tube stock from medium to heavy gauge. This particular adaptability of the apparatus and method to medium and heavy tube welding arises primarily from the use of a fluid of suitable current-carrying characteristics as the medium for the application of the current to the tube adjacent the seam line and the use of the generator itself as the distributing means for the current-carrying fluid medium. Through the use of direct current the "stitch effect" on the seam line is avoided and there is no "skin effect" in the conductors or in the tube stock and as a result the current and heat is not confined to the surface of the stock but reaches the whole interior of the seam, particularly in medium or heavy gauge tubing, resulting in a perfect and dependable weld.

This invention is based on the use of homopolar, unipolar, or acyclic generators for producing direct current. These generators present the advantage of simplicity of structure, mainly in that they have no commutator. They also have extremely high current capacity, and their inherent structural characteristics adapt them for high speeds since the rotating element is merely a metallic disk or cylinder or the equivalent.

Their disadvantage heretofore has been mainly lodged in the problem of the collection of high currents with rubbing or sliding contacts, but in the present structure all sliding contacts have been avoided through the use of a revolving generating element arranged so as to pump a liquid conductor into a stationary casing; the passage of the liquid conductor serving as a current path at the transition points where the relative velocity of any two parts of the current path is different.

The principal object of the present invention is to improve the art of homopolar electric generation and distribution in general but particularly with reference to direct current resistance welding, especially as applied to the welding of tubes at a high rate of production. A further object of the invention is to provide an apparatus and method of simple character and of high efficiency for use for welding purposes, particularly for tube welding. Another object of the invention is to provide a compact apparatus without commutators and sliding contacts which will not only generate direct current suitable for welding purposes but will also act as the means for distributing a fluid through the apparatus and along lines of distribution which will serve as an effective means for applying the current to the seam line of the tube stock and assist in the fabrication of a product having a seam free of stitches and united throughout the area of the abutting surfaces of the stock.

Other and further objects of the invention will appear in the course of the following description.

To the accomplishment of the foregoing and related ends, the invention, then, consists of the means and mode hereinafter fully described and particularly pointed out in the claims, the annexed drawings and the following description setting forth in detail certain mechanism and steps embodying the invention, such disclosed means and mode constituting, however, but several of various forms in which the principle of the invention may be used.

In said annexed drawings:—

Figure 2:
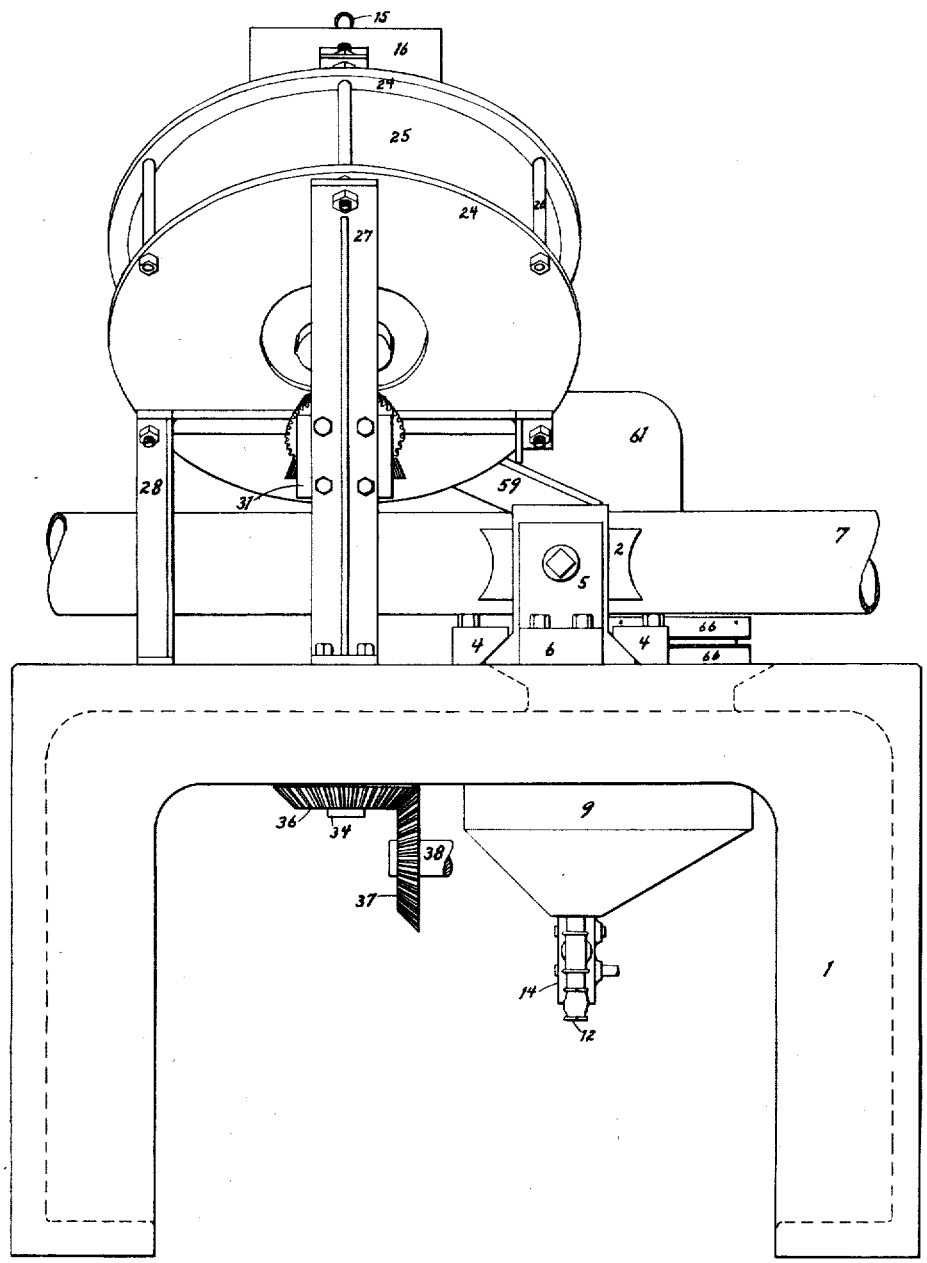

Fig. 1 is a side elevation, partly in section, showing one form of apparatus adapted to carry out the method as applied to the welding of tubing; Fig. 2 is a side elevation of a portion of the structure shown in Fig. 1; Figs. 3 and 4 are diagrammatic views showing details of the conducting ring and associated structure for the current conducting fluid and means of insulating the same to direct currents through them in a proper direction; Fig. 5 is a cross-section of the shell taken along the line 5—5 shown in Figs. 3 and 4, looking in the direction of the arrows; and Fig. 6 is a side elevation showing the generators when the armatures are revolved in opposite directions and the jets are disposed in opposite directions.

As clearly shown in Fig. 1 of the drawings, the apparatus comprises a frame 1, preferably in the form of a table, upon the body portion of which the pressure rollers 2 are supported in suitable yokes 3 which are engaged in slides 4 and are adapted to be moved toward or away from each other by means of adjusting screws 5 engaged through standards 6 adjacent the marginal edges of the table. The pressure rollers provide a welding throat and the tube stock 7 is adapted to be engaged therebetween with the seam line 8 upon the upper central position thereof.

Immediately beneath the table a reservoir 9 is provided for receiving the liquid to be recirculated, as will hereinafter be more particularly explained. Said reservoir is provided at its lower side with a conduit 11 terminating in a drain 12 and having a lateral connecting conduit 13 in which is positioned a pump 14 from which a return line 15 leads to a reservoir 16 supported above the table on the axial line of the welding throat. The upper reservoir is preferably made of heavy copper so as to provide conducting means for heavy current through its shell and on its under side it is provided with a drain cock 17. The reservoir preferably has its lateral bottom walls 18 inclined at an angle of approximately 45 degrees and each of said walls is formed with a bearing 19 for the shaft 21 of the generator 22. A suitable packing gland 23 is provided around each shaft at this point. Two generators are preferably employed, each being preferably mounted angularly at a 45 degree angle above and closely adjacent the welding throat. Each generator is a homopolar generator and comprises a casing formed of a pair of circular plates 24 and a cylindrical shell 25, which with the pole pieces hereinafter described provide the path for the magnetic circuit.

The plates are held to said shell by means of suitable bolts 26 extending through apertures at spaced points about the periphery of said plates. The casings are preferably supported upon standards 27, 28, and are suitably insulated therefrom at every point of contact, one of said standards being secured to one of the bolts through the casing at the upper side and the other standards being secured to the bolts of the casing adjacent the lower side. Suitable brackets 29 are engaged upon the upper bolts on their free ends and serve to support the upper reservoir. The standards supporting the upper portion of the casing also serve to support, in insulating relation, a journal 31 for the lower end of the shaft which carries the armature of the generator. This shaft is provided adjacent its lower end with an insulating bevel gear 32 which is engaged by a driving gear 33 on a vertical shaft 34, having a bearing 35 in the lower supporting bracket 28 for the casing, said shaft carrying on its lower end another bevel gear 36 which is engaged beneath the table with a bevel gear 37 connected with the power shaft 38.

Direct motor drive for the armature shaft may be provided. The armature shaft is preferably formed of copper or some equivalent efficient current-conducting metal and extends centrally through the casing heretofore described, each of the plates being centrally apertured to permit passage of the same. The shaft carries within a casing the armature which comprises a pair of spaced plates 41, 42, providing a narrow passageway 43 between the same, said plates being of annular form and having spiral vanes 44 on the inner faces thereof and being secured at their inner edges to the inner edges of sleeves 45 by means of suitable bolts 46 or other fastening elements, said sleeves being securely fitted to the shaft. The plates revolve between heavy steel pole pieces 47 of annular form, said pole pieces filling the casing transversely almost to the cylindrical shell, the intervening space being used for the windings of the field coils 48 of the generator. The field coils may have 900 turns of No. 18 copper wire where a generator is designed to operate at 1800 revolutions per minute and deliver 40,000 amperes at 1½ volts. The field coils are preferably excited from an external source and a 110 volt commercial direct current may be connected therewith. It is obvious that arrangement may be made to have the generator excite its own field coils after it has been started, but this involves a more complicated structure. An apparatus of the character described would be suitable for the welding of a $\tfrac{3}{16}$ths inch tube stock at the rate of approximately 20 feet a minute, said tube stock being formed into a standard pipe of 2 or 2½ inches diameter. On lighter gauge material the apparatus would operate at a rate of production from 60 to 100 feet a minute, depending upon the character of the material. The disks in the generator described are of approximately 32 inches diameter. The pole pieces carry on opposite sides packing glands 51, 52, and within the same are mounted ball bearings 53 at either side to provide free running of the armature shaft.

The armature shaft is provided on its upper end with a bore 54 extending to a point slightly below the plane of the armature and a plurality of apertures 55 is provided from the exterior of the shaft to the central bore adjacent the plane of the space between the armature disks. The armature disks terminate at approximately the outer surface of the annular steel pole pieces and their peripheral edges extend a short distance within a groove 56 formed on the inner face of a copper conducting-ring 57. The groove terminates in a volute channel 58 of gradually increasing diameter and adapted to receive the current-conducting liquid. The copper conducting rings referred to terminate in projecting spouts 59, 60, which extend from the casing to a point closely adjacent the seam line of the tube stock which passes through the welding throat. An insulating splash shield 61 is positioned between the pair of spouts referred to and serves to divert the liquid current-carrying medium downwardly toward the seam line of the tubing, thereby restricting the current to a path across the seam line.

The spouts will preferably extend in the same direction with reference to the movement of the tube stock and preferably in the direction of the movement of the stock, or, as shown in Fig. 6, the spouts 62, 63, may extend in opposite directions with respect to each other, one of the spouts directing the liquid in the same direction as the movement of the tube stock and the other spout directing the liquid in the opposite direction. When the spouts are directed in the manner first mentioned, and the two generators are rotated in the same direction, it is desirable to break the current carrying rings with insulating strips 64, 65, at points adjacent the spout portions thereof, the one in the manner shown in Fig. 3 and the other in the manner shown in Fig. 4. By this means the strong magnetizing effects of the one turn windings formed thereby may add to, rather than oppose, or in technical phraseology, "buck" the magnetizing effects of the main field windings. Using this method of construction, the shafts of the two generators may be electrically connected through flexible cables instead of through a common reservoir, or, by arranging the armatures in parallel planes, upon a single common shaft.

The lower reservoir heretofore referred to is mounted directly beneath the welding throat and as the welding liquid is discharged from the spouts, it flows downwardly about the tube stock over the baffles 66, or means for insuring its electrical discontinuity, into the lower reservoir, whence it is carried by the pump 14 located beneath the same through the return line 15 to the upper reservoir. An excess of current-conducting fluid must be provided in order to maintain a continuous downward stream thereof on either side of the seam line from the upper reservoir.

The current-conducting fluid may be any suitable current-carrying medium which has the necessary capacity for carrying currents of the enormous values hereinabove mentioned. Mercury is suitable for this purpose as well as many alloys such as Wood's metal and other fusible alloys of like character. In order to maintain such metals of low fusing point in a liquid condition, a plurality of passageways 67 have been provided through the bottom walls of the upper and lower reservoirs through which live steam or other heating fluids may be passed. After the welding operation is started, the heat applied to the reservoirs may be reduced or discontinued inasmuch as the temperature at the welding throat will be found sufficient to maintain such fluids in liquid condition throughout the apparatus. Instead of using steam or like fluids for heating the apparatus at the time of starting, it may be found desirable to warm the generators by means of alternating current directed through the field coils, which through hysteresis and eddy current losses in the core and in the disk will provide sufficient heat to maintain such conductors in a liquid condition.

The generator casings have been shown as mounted at an angle of 45 degrees to the seam line, but this has been done chiefly for the purpose of shortening the current path and permitting pole pieces of considerable size to be used and also permitting the generators to be symmetrical with respect to the armatures and the fields thereof.

It is to be understood, however, that it may be found desirable to use generators of relatively thin transverse dimensions even though this involves the offsetting of the fields to one side thereof or the modification of the armature shaft so as to support the armature at the end thereof rather than centrally.

The voltages in the two homopolar generators shown are generated in the disks 41 and 42 radially between the inner edges and the peripheries. The direction of flow of the magnetic flux in the two machines is so arranged that the voltages add, the two generators being connected in series through the upper ends of their shafts 21 and the common reservoir 16. The current set up by these voltages flows in the one machine radially across the armature disks to the periphery, thence in the stream of liquid to the conducting ring 57, then circumferentially around the ring and along the nozzle 59, again in the stream of liquid to the tube 7 on one side of the butted seam 8, across the seam where, due to its high resistance, a welding heat is attained, thence up the jet flowing from the nozzle 60, around the conducting ring of the second generator, across its liquid stream to its armature disks, up its heavy shaft to the reservoir 16 and down the shaft of the first generator to complete the circuit.

As has been heretofore stated, the invention in addition to its application to direct current resistance welding may find other industrial applications, particularly where very heavy direct currents at low voltages are required for certain special conditions of operation.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In a welding apparatus, a homopolar generator disposed adjacent the welding throat, and having a liquid tight casing and conduits associated therewith, fluid current conducting means within said casing and conduits, and means for moving said fluid means for carrying current to the work within said throat.

2. In a welding apparatus, a homopolar generator having a casing and passageways adapted to receive and discharge current conducting liquid within the same disposed adjacent the welding throat, and means in the voltage generating element of said generator serving as the impeller for forcing conducting liquid to the work.

3. In a welding apparatus, a homopolar generator comprising a field member, an armature within said field member and having a substantially liquid-tight casing about the same, said armature providing substantially radial liquid carrying passageways therein, means to rotate said armature and distribute current conducting liquid through said armature and into substantially frictionless contact with the work.

4. A direct current resistance welding apparatus having in combination a homopolar generator, comprising a field member, an armature, and a liquid-tight casing therefor with conduits communicating therewith, a liquid current carrying medium associated with said apparatus, and means for circulating said current carrying medium for repeated use therein.

5. A direct current resistance welding apparatus having in combination a homopolar generator, comprising a field member, an armature, and a liquid-tight casing therefor with conduits communicating therewith, a liquid current carrying medium associated with said apparatus, means for circulating said current carrying medium for repeated use therein, and means for maintaining said liquid medium in a proper state of fluidity.

6. An electric welding apparatus comprising a plurality of homopolar generators, each having liquid current-conducting means within the same, means providing a welding throat adjacent thereto, and a circuit including in series said generators and a butted seam of metal stock in said welding throat.

Signed by me, this 26th day of June, 1929.

EVERETT CHAPMAN.

CERTIFICATE OF CORRECTION.

Patent No. 1,905,147. April 25, 1933.

EVERETT CHAPMAN.

It is hereby certified that error appears in the printed specification of the above numbered patent requiring correction as follows: Page 4, line 54; claim 3, for "armature" read apparatus; and that the said Letters Patent should be read with this correction therein that the same may conform to the record of the case in the Patent Office.

Signed and sealed this 20th day of February, A. D. 1934.

F. M. Hopkins (Seal)

Acting Commissioner of Patents.